Dec. 3, 1940.  A. BERGER  2,223,715
HYDRAULIC TRANSMISSION CONTROL
Filed March 10, 1938  2 Sheets-Sheet 1

INVENTOR:
ARTHUR BERGER
BY
ATTORNEYS

Dec. 3, 1940.  A. BERGER  2,223,715
HYDRAULIC TRANSMISSION CONTROL
Filed March 10, 1938  2 Sheets-Sheet 2
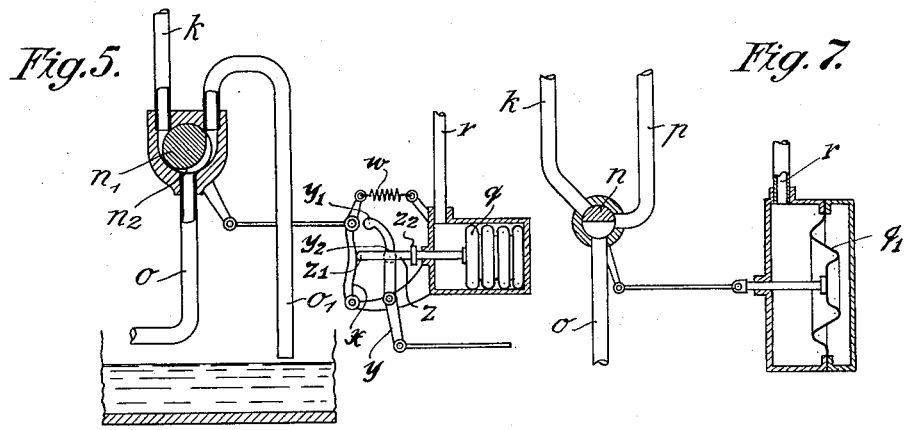
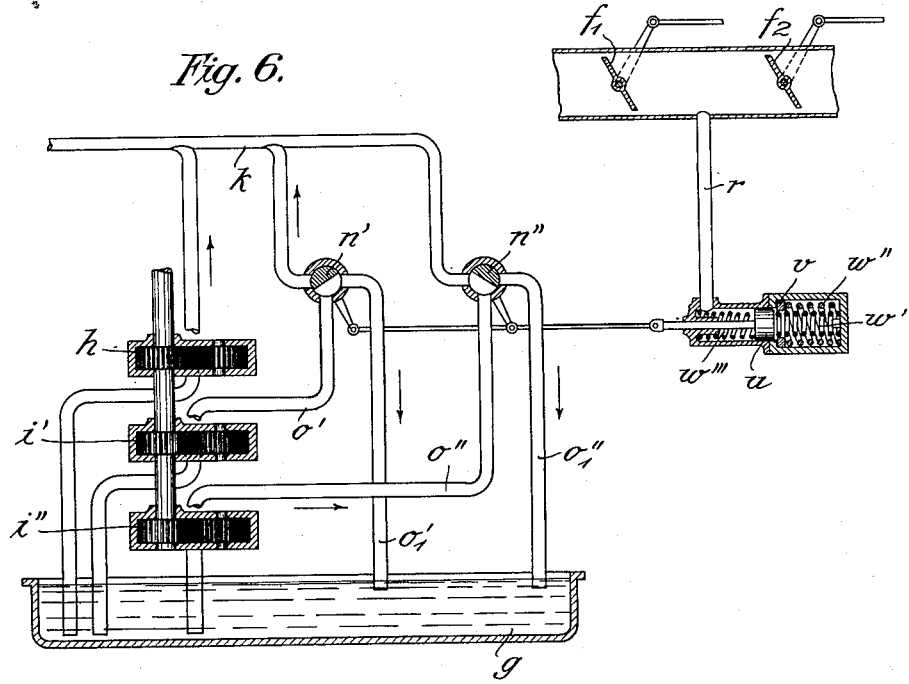
INVENTOR
ARTHUR BERGER
ATTORNEYS Patented Dec. 3, 1940

2,223,715

UNITED STATES PATENT OFFICE 2,223,715

HYDRAULIC TRANSMISSION CONTROL

Arthur Berger, Stuttgart-Oberturkheim, Germany, assignor to Daimler-Benz Aktiengesellschaft, Stuttgart-Unterturkheim, Germany Application March 10, 1938, Serial No. 195,003
In Germany March 11, 1937

9 Claims. (Cl. 60—54)

This invention relates to an improved control for a hydraulic transmission device and is particularly concerned with hydraulic transmissions employed between aircraft engines and their superchargers. With hydraulic transmissions of known type, a control is effected by altering the liquid charging of such transmissions, that is to say by more or less filling or emptying them.

One object of the invention is to provide two or more liquid forcing devices or pumps for charging a hydraulic transmission and a control for turning off or diverting one or more pump outputs, the partial charging of the transmission being then maintained by the remainder. Preferably gear wheel pumps are used as the forcing devices.

Another object is to provide an assemblage of pumps whose combined delivery will completely fill the transmission so that the latter will operate with minimum slip and whose minimum delivery, after exercise of control, will maintain a charge for preventing a given permissible slippage from being exceeded, as for example a slippage of 20 to 40%, or, at most 50%.

The exercise of the aforesaid control may be effected manually or automatically as by the aid of a barometric device. In the latter case, the governing pressure may be that of the atmosphere or of the blower delivery.

The invention obviates all danger of overheating of transmission parts when the transmission runs with maximum slip, for it ensures that a certain safe slippage shall not be exceeded. Moreover, it is a further object of the invention to employ for cooling purposes the output of any pump not required for serving the transmission.

Further features and details will appear from the description of examples illustrated in the accompanying drawings, wherein:

Fig. 5 is a partial cross-sectional view of a modified type of control and pressure-responsive device, which may be substituted for the corresponding devices illustrated in Fig. 1;

Fig. 6 is a partial cross-sectional view of a modified arrangement of pump; and

Fig. 7 illustrates a modified type of pressure-responsive device shown in connection with a control device such as illustrated in Fig. 1.

Figure 1:
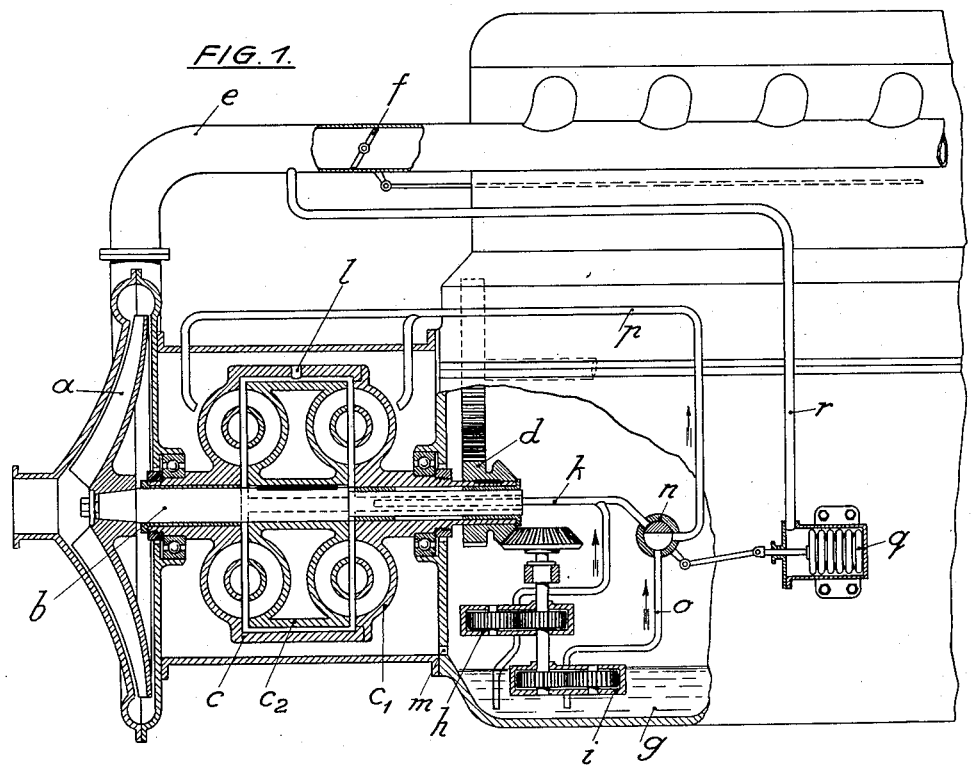
Figure 1 is a sectional side elevation of an aero engine with a supercharger and transmission arrangement having these improvements.

In Figure 1, $a$ is a blower or supercharger which is arranged upon the shaft $b$ and is driven through the liquid transmission $c$. The latter is preferably a double transmission with two working spaces and includes a driving part $c_1$ and a driven part $c_2$. The transmission is driven by a pinion $d$ which may be the final element of a step-up transmission from the engine. The charging air is supplied to the engine from the supercharger through a duct $e$ and the pressure beyond a throttle $f$ can be controlled by adjusting the throttle by hand or other means.

For varying the speed of the supercharger, the liquid transmission $c$ can be controlled by partial emptying. For this purpose, the transmission is connected to a liquid circuit which, for example, may be branched from the lubricating oil circuit of the internal combustion engine. The liquid is in this case supplied from the vessel $g$ by two gear wheel pumps $h$ and $i$, which are connected in parallel and may be arranged upon a common shaft driven from the engine. The two outputs can be delivered into a passage $k$ and so into the interior of the hollow blower shaft $b$. Centrifugal action assists the liquid to pass from the hollow shaft through the radial passages seen in Figure 1 and so into the working spaces of the transmission. It can then pass through a throttled opening $l$ into the housing of the transmission $c$ and flow back through a return port $m$ into the vessel $g$.

Figure 2:
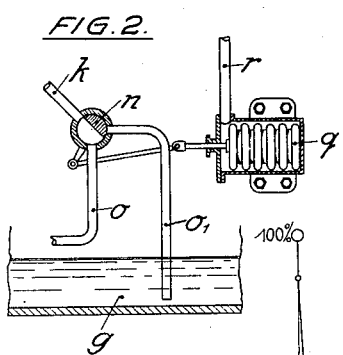
Figure 2 is a sectional view of a modification of the control device seen in Figure 1.

The pump $i$ can be turned off for reducing the filling or charging of the transmission. For this purpose, the delivery $o$ of the pump $i$ is provided with a change-over cock $n$ which, as shown by Figure 1, can be adjusted in such fashion that the oil supplied by the pump $i$, instead of being supplied to the passage $k$ is supplied to a pipe $p$ which terminates in jets directed towards the exterior of the transmission. Or, and as shown in Figure 2, the cock $n$ may be adjusted for diverting the delivery of the pump $i$ from the pipe $k$ into a return passage $o_1$ leading back to the vessel $g$. In the former case, the liquid diverted from the interior to the exterior of the transmission is employed for cooling the transmission, the liquid being, for example, sprayed against the outside walls of the driving transmission half $c_1$. In the latter case, the pump $i$ is simply by-passed or short circuited by the appropriate turning of the cock $n$.

The adjustment of the cock $n$ may be effected by hand or automatically. In the latter case, the cock is connected to a barometric capsule $q$ which is disposed inside a housing. The latter may be connected by a passage $r$ either to the blower passage $e$ as in Figure 1 or to the atmosphere. Instead of a barometric capsule, a suitable pressure-responsive diaphragm $q_1$ can obviously be used, in the manner illustrated in Fig. 7.

Figure 4:
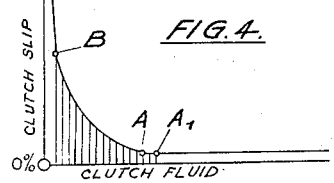
Figure 4 is a curve obtained by plotting transmission charging against transmission slippage.

The slip of a liquid transmission in dependence upon the qauntity of liquid supplied to the transmission is plotted in Figure 4. As is evident, the slip has, above a certain quantity of liquid from the point A onwards, a constant minimum value (in practical cases about 2%) which corresponds to complete filling of the transmission. An increase of the quantity of liquid beyond the value A results therefore in practically no change of the slip. Preferably, however, for reasons of adequate stability, the maximum quantity is selected somewhat higher, for example corresponding to the point $A_1$.

Upon reduction of the quantity of liquid, the slip grows to an increasing extent, ultimately so abruptly that the curve rises almost vertically and reliable control becomes difficult. At the same time, with increasing slip the heating inside the transmission due to air friction becomes so considerable that there is danger of overheating of the transmission. It is therefore preferable not to reduce the liquid beyond a certain quantity which corresponds, say, to the point B in the control curve. Advantageously, this point lies between a slip of 20 and 40%, if possible, however, not above 50%.

In accordance with the invention, therefore, the pumps $h$ and $i$ are so designed that together they supply a quantity of liquid corresponding to the point $A_1$, whilst, after turning off of the pump $i$, the pump $h$ alone still supplies a quantity of liquid which is given by the point B in the control curve.

Consequently, the following mode of operation of the arrangement according to Figure 1 results:

Normally, for example when the aircraft is in the vicinity of the ground, the pump $i$ is turned off and the oil supplied by it flows back into the vessel $g$ (Figure 2) or, for example, is sent through the pipe $p$, Figure 1, for the cooling of the liquid transmission. The latter is supplied solely by the pump $h$ and runs, partially empty, with a slip corresponding to the point B. The supercharger $a$ thus works with reduced speed.

If the external air pressure falls and consequently the pressure in the supercharger passage $e$ falls (for example at greater flying altitudes), then the barometric capsule $q$ expands and the cock $n$ is turned clockwise and connects the pump $i$ to the passage $k$. Both pumps $h$ and $i$ now supply liquid to the transmission; this in such quantity, moreover, that the throttle bore $l$ is no longer sufficient to permit the liquid to issue again at the same rate as it is supplied. The transmission then fills completely, the slip falling according to the curve B—$A_1$. Consequently the speed of the supercharger increases so that the pressure in the passage $e$ rises again. The pressure beyond the throttle flap $f$ can of course be influenced by adjustments of the said flap.

Figure 3:
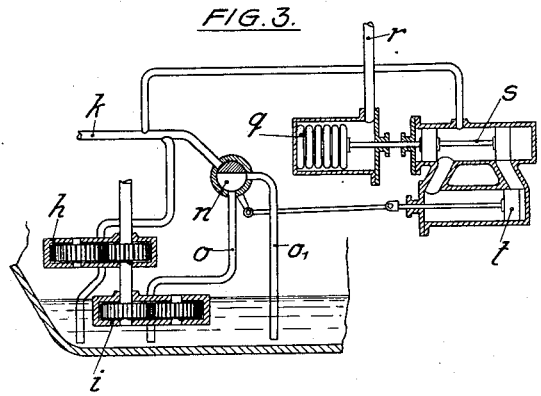
Figure 3 is a sectional view of a further modification.

A somewhat modified control device is illustrated in Figure 3. In this case, the cock $n$ is adjusted by a piston $t$ which is displaced to the right or left by oil pressure derived from the pump deliveries and is controlled by a slide valve $s$ coupled to the barometric capsule $q$.

In place of a simple change-over cock $n$, a gradually or progressively controllable throttle valve or the like may be employed. This may take the form of the control cock $n_1$ as illustrated in Fig. 5, which is provided with a crescent-shaped groove $n_2$ permitting a gradual connection of the delivery conduit $o$ with either the passage $k$ or the return conduit $o_1$. Obviously, this type of control cock may be used in place of those illustrated in Figs. 1, 2 or 3. At the same time, in Fig. 5 there is illustrated an arrangement whereby the effect of the barometric capsule $q$ may be manually varied. In this construction, the barometric device $q$ acts through a rod $z$ and an abutment $z_1$ upon a crank $x$ to which the actuating crank for the cock is connected. By means of a return spring $w$ the crank $x$ is normally held in actuating contact with the abutment $z_1$. A hand crank $y$ is so positioned as to be normally inactive, the control of the cock being directly affected by the pressure-responsive device $q$. By an adjustment of the crank $y$ in the counterclockwise direction, however, the end $y_1$ of the crank $y$ is brought into contact with the crank $x$ and this can then be adjusted toward the left against the action of the spring $w$. As a result of this, the crank $x$ is removed from the abutment $z_1$ so that the control cock can be moved independently of the pressure-responsive device $q$ in a direction to connect the conduits $o$ and $k$. Additionally, by rotation of the crank $y$ in the clockwise direction, its abutment $y_2$ will come into contact with the abutment $z_2$ on the rod $z$, whereby the pressure capsule $q$ is prevented from expanding. This has the effect of preventing the regulation of the transmission in response to the charging pressure. While the manual means for taking over the control of the change-over cock has been particularly illustrated in connection with the gradual type of cock illustrated in Fig. 5, it will be obvious to those skilled in this art that such manual control may be applied to the arrangement such as illustrated in Figs. 1 and 2.

In the modification illustrated in Fig. 6 three pumps $h$, $i'$ and $i''$ are provided. The pump $h$ is adapted to run continuously and its delivery is not controlled. The delivery of the pumps $i'$ and $i''$ is, however, respectively controlled by the cocks $n'$ and $n''$ connected thereto by conduits $o'$ and $o''$. Both control cocks are, in the example shown, actuated by the same control rod which is adjusted by a piston $u$, whose left side acts under pressure of the charging conduit between the two throttle valves $f_1$ and $f_2$. The right side of the piston $u$ acts under the force of two springs $w'$ and $w''$, of which the latter presses against an abutment $v$ acting against the piston $u$ as soon as the pressure upon the left side of the piston exceeds a predetermined value. The weaker spring $w'''$ prevents any undesirable play in the system. As ilustrated in the drawing the piston $u$ is in its central position. In this position the pump $i'$ is shunted, in that the control cock $n'$ connects the supply conduit $o'$ with the return conduit $o_1'$. Oil is accordingly supplied to the conduit $k$ through the pump $h$ and also through the pump $i''$, since the cock $n''$ connects the pump $i''$ through the conduit $o''$ with the connecting conduit $k$. If the pressure in the charging conductor as exemplified in the pipe $r$ falls, the piston $u$ is adjusted toward the left under the action of the spring $w'$, whereby the cock $n'$ will connect the conduit $o'$ with the passage $k$, thereby making all three pumps effective for supplying to the transmission. In this case, the spring $w''$ is ineffective, since the abutment $v$ will come up against the piston housing and will therefore not follow the piston toward the left. Upon a greater pressure in the charging conductor, however, the piston $u$ is moved toward the right, namely against the force of both springs $w'$ and $w''$. Upon such a movement of the piston the cock $n''$ will be rotated to cut off the supply of oil coming from the pump $i''$ and will connect the conduit $o''$ with the return conduit $o_1''$. Accordingly, in this case, the pump $h$ is the only one now supplying the fluid.

While I have herein shown and described only certain embodiments of certain features of my present invention, it is to be understood that they are to be regarded merely as illustrative and that I do not intend to limit myself thereto except as may be required by the claims which follow.

I claim:

1. In combination, a hydraulic transmission, a plurality of liquid forcing devices operative for circulating liquid through said transmission, and control means for cutting out a given number of said forcing devices, the remainder having a sufficient capacity for satisfying the minimum liquid charge requirements of said transmission.

2. In combination, a hydraulic transmission, a plurality of liquid charging devices serving said transmission, and a control operative for reducing the output of only certain of said devices, the remainder being sufficient for supplying the minimum liquid charge requirements of said transmission.

3. In combination, a hydraulic transmission, a plurality of pumps serving said transmission with operating liquid, a control operative on the delivery of a fraction of the total number of pumps, and a barometric device operative on said control.

4. In combination, a hydraulic transmission, a plurality of liquid forcing devices operative for circulating liquid through said transmission, and a control means operative for cutting out a fraction of said liquid forcing devices the remainder having a capacity for charging the transmission to such an extent that the slippage does not exceed a permissible maximum of 50%.

5. In combination, a hydraulic transmission, a plurality of pumps adapted for serving said transmission with operating liquid, transmission-cooling means, and a control device operative on the delivery of a fraction of the total number of pumps for diverting the output of such fraction into said transmission-cooling means.

6. In combination, a hydraulic transmission, a plurality of pumps adapted for serving the interior of said transmission with operating liquid, a pipe system operative for delivering cooling liquid to the exterior of said transmission, and a control device operative on the delivery of a fraction of the total number of pumps for diverting the output of such fraction into said pipe system.

7. In combination, a hydraulic transmission, a plurality of pumps adapted for serving said transmission with operating liquid, transmission-cooling means, a control valve operative on the delivery of a fraction of the total number of pumps for diverting the output of such fraction into said transmission-cooling means, and a barometric device operatively connected with said control valve.

8. In combination, a hydraulic transmission, a plurality of pumps adapted for serving the interior of said transmission with operating liquid, a pipe system operative for delivering liquid to the exterior of said transmission, and a control valve operative on the delivery of a fraction of the total number of pumps for diverting the output of such fraction into said pipe system.

9. In combination, a hydraulic transmission, a plurality of pumps having a common sump and adapted for serving the interior of said transmission with operating liquid, a pipe system operative for delivering liquid back to said sump, and a control valve operative on a delivery of a fraction of the total number of pumps for diverting the output of such fraction into said pipe system.

ARTHUR BERGER.